(12) United States Patent
Vallot

(10) Patent No.: US 6,498,996 B1
(45) Date of Patent: Dec. 24, 2002

(54) VIBRATION COMPENSATION FOR SENSORS

(75) Inventor: Lawrence C. Vallot, Shoreview, MN (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/366,926

(22) Filed: Aug. 4, 1999

(51) Int. Cl.$^7$ ................................................ G06F 5/01
(52) U.S. Cl. .................. 702/104; 702/56; 702/103; 702/105; 702/106; 702/116
(58) Field of Search .................. 702/56, 103–106, 702/116; 73/1.37, 1.38, 514.29, 602; 700/280

(56) References Cited

U.S. PATENT DOCUMENTS

| | | | | |
|---|---|---|---|---|
| 4,675,820 A | * | 6/1987 | Smith et al. | 364/453 |
| 5,012,428 A | * | 4/1991 | Ueno et al. | 364/508 |
| 5,379,223 A | | 1/1995 | Asplund | |
| 5,445,028 A | * | 8/1995 | Bianchi et al. | 73/593 |
| 6,285,947 B1 | * | 9/2001 | Divljakovic et al. | 701/110 |

* cited by examiner

Primary Examiner—Marc S. Hoff
Assistant Examiner—Felix Suarez
(74) Attorney, Agent, or Firm—Dennis C. Bremer

(57) ABSTRACT

Vibration induced errors in sensors are predicted based on a measurement of vibration power spectra. Accelerometer samples are used to estimate vibration power spectral densities. A calibration procedure using suitable vibration stimulus provides the ability to estimate sensitivity coefficients to be used to compensate for the vibration induced error. The vibration power spectrum estimates are combined with previously obtained calibration coefficients to generate real time vibration-induced error corrections. Vibration bias sensitivity coefficients are estimated in a controlled environment to ensure their accuracy to compensate the sensor in real-time applications using acceleration measurement devices such as accelerometers mounted to a rigid sensor assembly shared with the sensor to be compensated. Vibration bias estimates are then used to correct the outputs of the sensors(s) being compensated for vibration-induced error.

30 Claims, 4 Drawing Sheets

VIBRATION COMPENSATION FOR SENSORS

FIELD OF THE INVENTION

The present invention relates to sensors, and in particular to the compensation for vibration-induced error affecting the operation of such sensors.

BACKGROUND OF THE INVENTION

Inertial sensors, such as gyroscopes and accelerometers, are often adversely affected by vibrations. They may be very sensitive to such vibrations. In fact, vibration sensitivity can often be a dominant performance limiting error source. Many inertial sensors rely on micro-electromechanical sensor (MEMS) devices which utilize vibratory mechanisms for rate/acceleration sensing. These types of sensors have shown evidence of significant vibration sensitivity problems.

Inertial sensors are often used in environments that inherently subject the sensors to significant vibrations. These include use in aircraft and weapons, where the power plants and environment serve as significant sources of vibration. For example, a commonly used resonant beam accelerometer that is often viewed as a one milli-g accuracy sensor can exhibit bias shifts on the order of several milli-g's under typical operational vibration environments.

For inertial sensors which exhibit vibration sensitivity, the most common effect is a slowly varying low frequency error component which changes as a function of the applied vibration spectrum. In some applications, such as a global positioning system (GPS) aided inertial system, the effect of the vibration induced bias shift can be trimmed or estimated such as by use of a Kalman filter. However, when the vibration level or spectrum shape changes significantly, the vibration-induced error also changes, diminishing the value of any previously obtained calibration.

In the case of an inertially guided munition launched from an aircraft equipped with a high quality inertial navigation system (INS), an in-flight transfer alignment and calibration procedure is usually performed prior to release of the guided munition. During this period, velocity differences (or related quantities) between the aircraft INS and the weapon INS are processed by a Kalman filter to initialize the attitude and heading of the weapon INS, and to estimate some of its inertial sensor errors, typically including the gyro and accelerometer bias errors. The vibration spectrum present at the weapon inertial measurement unit is strongly driven by its captive-carry environment, such as a wing-store station or weapon bay. During the captive carry, the weapon's inertial sensor bias errors will be affected by the vibration environment. However, after release of the weapon, a significantly different vibration environment will exist, leading to gyro and accelerometer bias shifts due to a change in the vibration-induced errors. Depending on its magnitude, this change can negate any benefit of the pre-launch weapon inertial measurement unit calibration. There is a need to minimize the detrimental effects of such changes in vibration environment.

Other factors can also cause such bias shifts. Anything that causes a change in the vibration environment of a sensor can result in a bias shift. Changes in speed of any vehicle having such sensors can result in different vibration environments due to aerodynamic differences and also due to mechanically based resonant frequency changes. This can by observed by any passenger in a car, especially older cars, as it approaches speeds that are higher than intended, or equipment of the vehicle changes through damage. Vibration environments can also change as engines are operated at different revolutions per minute, or depending on the overall load condition of the vehicle.

There is a need for a better mechanism to compensate for vibration-induced errors affecting inertial sensors. There is a further need to compensate for changes in vibration environments that affect such sensors. There is a need for such compensation to be performed both accurately and quickly.

SUMMARY OF THE INVENTION

A factory calibration procedure is performed by subjecting a sensor to suitable vibration stimulus, thereby exposing sensitivity coefficients relating vibration power levels at various frequencies to the bias-like error of the sensor. In the real-time application of the sensor, accelerometer samples are collected and used to characterize the actual vibration environment, specifically, the amount of vibration energy in various portions of the frequency spectrum. Predicted sensor vibration-induced error is calculated based on the measured vibration spectrum and the previously-obtained factory calibration coefficients. The predicted vibration-induced error is then applied as a compensation to the sensor output.

In one embodiment, high rate vibration measurement samples from the accelerometers are provided as the input to a power spectral density estimator. The vibration power spectrum estimates are then combined with previously obtained calibration coefficients to generate the real time vibration-induced bias correction. Vibration bias sensitivity coefficients are estimated in a controlled environment to ensure their accuracy to compensate the sensor in real-time applications.

In a further embodiment the high data rate vibration samples are obtained using acceleration measurement devices such as accelerometers mounted to a rigid sensor assembly shared with the sensor to be compensated. Vibration bias estimates are then combined with outputs from both a plurality (typically three or more) of gyros and a plurality of accelerometers, which combined form an inertial measurement unit.

In yet a further embodiment, a digital signal processor is used to perform calculations to obtain the vibration power spectral density and then provide the sensor vibration-induced error estimates in real time at a high rate. Still further embodiments utilize software to perform the calculations, or further combinations of hardware, software and firmware.

DETAILED DESCRIPTION

In the following description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the scope of the present invention. The following description is, therefore, not to be taken in a limited sense, and the scope of the present invention is defined by the appended claims.

The description is divided into multiple sections. The first section describes a mechanism for estimating and correcting a sensor for vibration-induced error. This is followed by a description of an algorithm implemented by the mechanism. A conclusion follows, which describes benefits.

Figure 1:
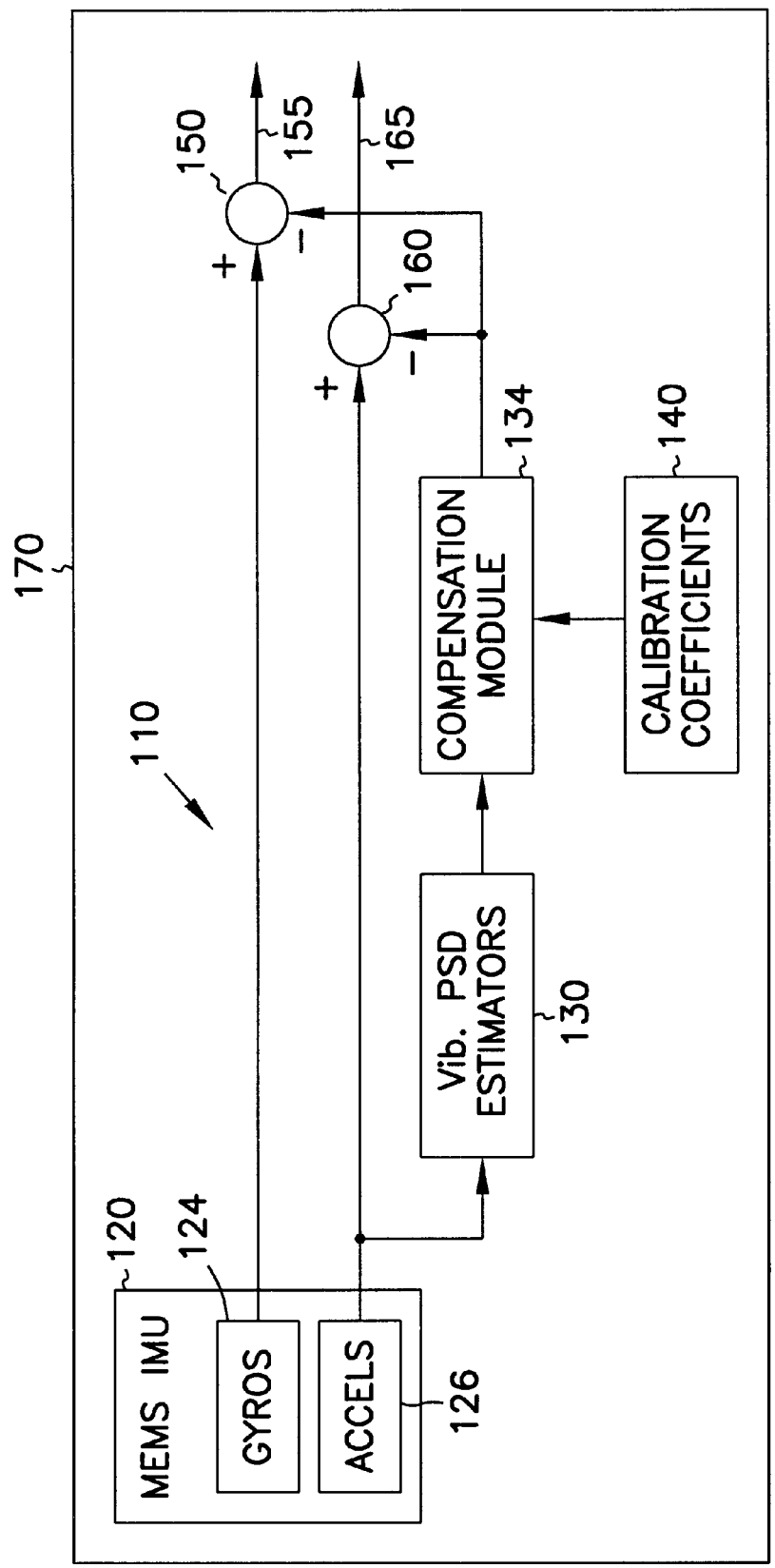
FIG. 1 is a block diagram of a mechanism for estimating and correcting a sensor for vibration induced error.

In FIG. 1, a block diagram showing a mechanism for estimating and correcting for vibration induced errors is indicated generally at 110. A housing or other mounting device 120 in one embodiment contains a microelectromechanical sensor (EMS) device, for example, an inertial measurement unit (IMU). This type of sensor relies on vibratory mechanisms for rate/acceleration sensing. The sensor is a Coriolis-type vibratory gyro 124 in one embodiment which provides a first output representative of directional changes. An accelerometer 126 is also mounted to housing 120 to provide a second output representative of acceleration. The second output is provided to a vibration power spectral density (PSD) estimator 130, which provides estimations of the power spectral densities of vibrations as a function of high frequency accelerometer 126 measurements. In one embodiment, the frequency of such measurements is at least twice the highest expected frequency of vibration to ensure sufficient accuracy of measurements. Sample rates may be on the order of 5 KHz or higher.

The PSD estimates are formed at a relatively low rate, for example 1 Hz, and are provided to a compensation module 134, which utilizes calibration coefficients 140 to provides vibration-induced bias estimates or compensation values, both for the gyroscope first output and the accelerometer second output. An adder 150 receives the first output and a gyro vibration-induced bias estimate from module 134, and provides a compensated gyroscope output on a line 155. An adder 160 receives the second output and an accelerometer vibration-induced bias estimate from module 134, and provides a compensated accelerometer output on a line 165.

To ensure that the vibration measurements correspond to the sensor being compensated, the components are mounted to a rigid sensor assembly indicated at 170 and shared with the sensor to be compensated.

The basic model for vibration-induced bias error is that the bias depends in part on the vibration power spectral densities (and possibly cross power densities):

$$\text{vibration bias} = f(S_{xx}(\omega), S_{yy}(\omega), S_{zz}(\omega))$$

where $S_{xx}(\omega)$, $S_{yy}(\omega)$, and $S_{zz}(\omega)$ represent the vibration power spectral densities in the sensor's x, y and z axes. In one embodiment, these accelerometer axes are those that are customarily referred to as the input axis, hinge axis, and pendulous axis of the accelerometer.

In one embodiment, an accelerometer exhibits a sensitivity to input axis vibration, a common characteristic of devices with non-negligible scale factor nonlinearity. To simplify, assume that the device does not have cross-axis vibration sensitivity. In this case, the vibration induced bias $\delta a_x$ depends only on input axis vibration:

$$\delta a_x = f(S_{xx}(\delta))$$

Figure 2:
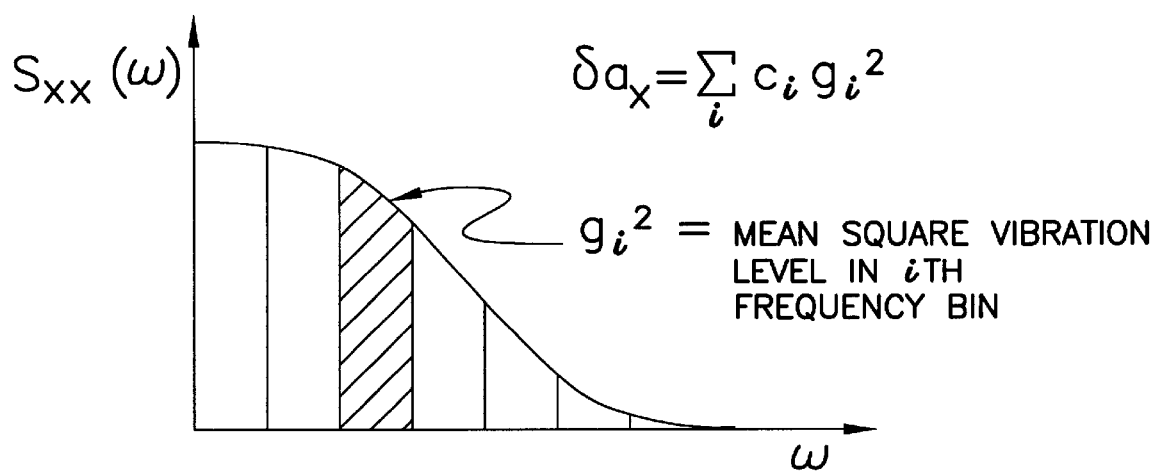
FIG. 2 is a graph showing a vibration-induced error model for a simplified example.

The vibration spectrum can be broken up into a set of frequency bins, and the sensitivity of the bias error to the vibration power within each bin is defined as illustrated in FIG. 2, which is intended as a typical graph of the spectral density versus frequency. The vibration-induced bias is then expressed as a sum over the frequency bins:

$$\delta a_x = \Sigma_i c_i g_i^2$$

where $g_i^2$ represents the vibration power (mean squared acceleration) in the $i^{th}$ frequency bin, and $c_i$ is the vibration-induced bias error sensitivity coefficient for that bin. Estimates for the coefficients $c_i$ shown in the model are determined during factory calibration of the individual inertial sensors.

In an alternative embodiment, the coefficients are determined for a small number of sensors referred to as a family of sensors, and the typical coefficient values are applied as compensation coefficients for all sensors of the same type. The calibration process may thus be applied to a single manufacturing batch of sensors, or any other family quantum of sensors that are likely to be similarly affected by vibration. This eliminates the need to perform extensive factory calibration procedures on every production sensor, but may retain most of the accuracy of the vibration-induced error compensation.

In one embodiment, the frequency bins are of equal size and cover the frequency range at which vibration power may significantly affect the sensors. In further embodiments, the frequency span of the bin is adjusted such that in frequency ranges where vibrations are most likely to affect the sensors, more bins are concentrated, and in other less significant frequency ranges, fewer bins are used. In one embodiment, the bins are coupled to a bank of bandpass filters, each covering one the frequency bins. The mean squared acceleration at the output of each of the bandpass filters is used as a measure of the vibration power in each bin.

A sine sweep vibration profile is used as test stimulus to provide observability of the model coefficients. The center frequency of the narrow-band sinusoidal vibration stimulus is swept over the range of vibration frequency typically encountered by the sensor in its intended application.

Figure 3:
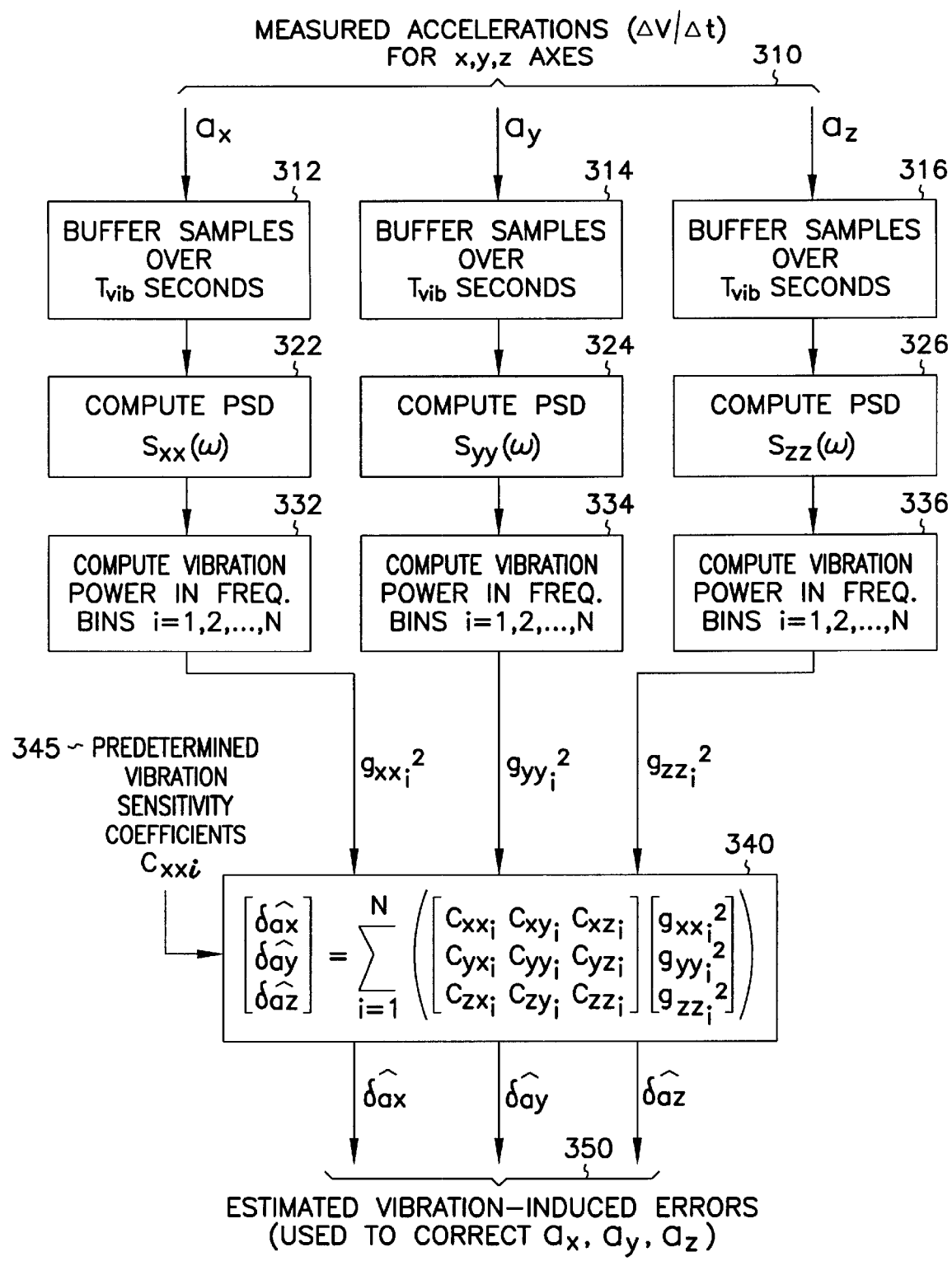
FIG. 3 is a flowchart representing a computer implementable method for estimating and correcting a sensor for vibration induced error.

A block diagram flow chart is shown in FIG. 3. Measured accelerations (dv/dt) for x, y and z axes are provided at 310 and sampled in each of the respective axes at 312, 314 and 316 over a desired time interval. Respective power spectral densities are then computed at 322, 324 and 326. For each axis, the vibration power is then computed for each desired bin at 332, 334 and 336. There are N bins shown, and the actual number of bins varies depending upon the desired accuracy of correction and computational power available. The vibration induced errors are calculated at 340 with predetermined vibration sensitivity coefficients provided at 345. The calculation of the vibration induced errors at 340 is discussed in further detail below, and provides the corrections for each of the axes at 350.

Figure 4:
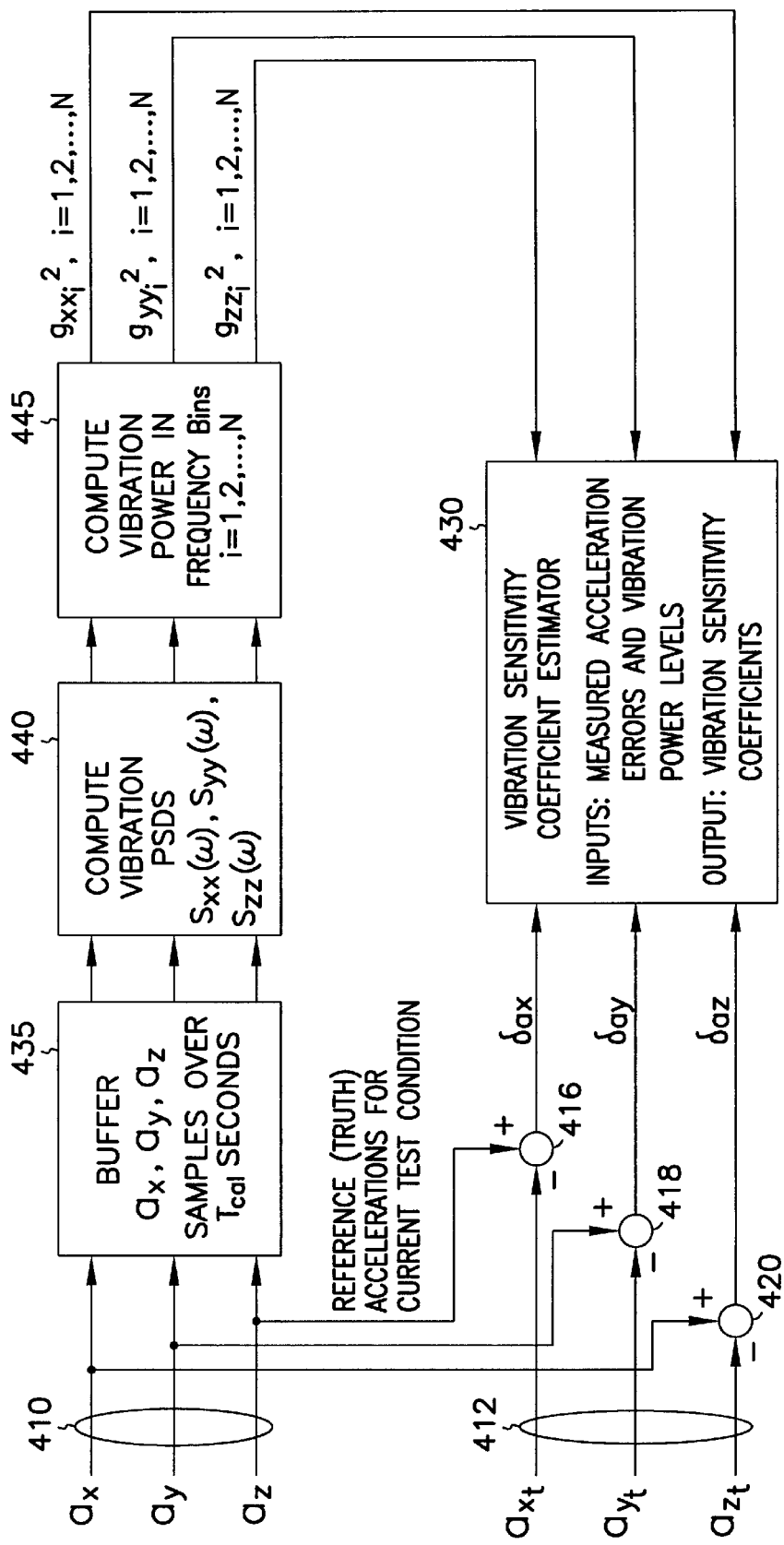
FIG. 4 is a block diagram showing the estimation of vibration sensitivity coefficients given reference accelerations.

FIG. 4 is a block diagram showing calibration of a vibration-induced error model for a triad of accelerometers, including the dependence of each sensor's error as a function of vibration power in a set of three principal axes that are nominally aligned with the accelerometers' input axes. Measured accelerations in each axis are provided at 410 in response to actual reference or truth accelerations provided by a current test condition at 412. A difference for each axis is provided by adders 416, 418 and 420, the outputs of which are provided to a vibration sensitivity coefficient estimator 430. The measured accelerations 410 are also provided to a buffer 435, which samples the accelerations in each axis over a predetermined calibration time at a rate at least twice the highest frequency desired to be sampled in order to obtain valid sampling data. Vibration power spectral densities are then computed at 440 along each axis and then the vibration power in each of N frequency bins is computed at 445. These values are then provided to the estimator 430.

Calibration of the necessary model requires a number of different test conditions, where a test condition is defined by the axis of the applied vibration stimulus and the frequency bin in which most of the vibration energy is concentrated. In this case, a model for the vibration-induced error on the jth test condition is $$\begin{bmatrix} \delta ax \\ \delta ay \\ \delta az \end{bmatrix}_j = \sum_{i=1}^{N} \left( \begin{bmatrix} Cxx_i & Cxy_i & Cxz_i \\ Cyx_i & Cyy_i & Cyz_i \\ Czx_i & Czy_i & Czz_i \end{bmatrix} \begin{bmatrix} gxx_i^2 \\ gyy_i^2 \\ gzz_i^2 \end{bmatrix} \right)$$

which can be written as $$\delta a_j = H_j c$$

where c is the 9N-element column vector formed form the vibration sensitivity coefficients $$Cxx_i, Cxy_i, Cxz_i, Cyx_i, Cyy_i, Cyz_i, Czx_i, Czy_i, Czz_i \text{ for } i=1, 2 \ldots N$$

and $H_j$ is a 3×9 N coefficient matrix comprised of the measured 3-axis vibration power levels in the N vibration frequency bins.

Data collected over a sufficient number (M) of test conditions (vibration stimulus in each of the three principal axes, each over a number ($\geq$N) of different dominant vibration frequencies) can be used to develop the composite vibration-induced error model $$\begin{bmatrix} \delta a_1 \\ \ldots \\ \delta a_2 \\ \ldots \\ \vdots \\ \ldots \\ \delta a_M \end{bmatrix} = \begin{bmatrix} H_1 \\ \ldots \\ H_2 \\ \ldots \\ \vdots \\ \ldots \\ H_M \end{bmatrix} c$$

or more compactly, $$y = Hc$$

The measurement vector y represents the vibration-induced acceleration errors present in the three accelerometer's outputs at each test condition. The vector of unknowns (c) represents the vibration sensitivity coefficients to be estimated. The matrix H is comprised of the measured vibration power levels in the three principal axes for a minimum of N vibration frequency bins.

Given the form of the above measurement model, the well-known least squares estimate of the vibration sensitivity coefficients is given by $$\hat{c} = (H^T H)^{-1} H^T y$$

Other well-known estimation algorithms are also used to generate the vibration sensitivity coefficient estimates in different embodiments, including a weighted least squares estimator, maximum likelihood type estimators, and recursive estimators such as the Kalman filter.

As an alternative to factory calibration, some applications use on-line estimation of the vibration sensitivity coefficients. In one embodiment, a global positioning system (GPS) aided inertial navigation system, the GPS provides accurate measurements of position and velocity (or equivalently, pseudorange and/or deltarange for a plurality of GPS satellites). The GPS measurements expose the position and velocity errors of the navigation solution formed using the IMU gyroscopes and accelerometers, which are affected by host vehicle vibration. Processing the GPS measurements and the measured vibration spectrum in, for example, a GPS/inertial Kalman filter algorithm provides observability of the vibration-induced error sensitivity coefficients.

Although the simplified example assumes that the sensor is affected by only a single component of the three dimensional vibration stimulus, in practice it is expected that a sensor may be influenced by the vibration spectra acting on all three axes. This three-dimensional vibration stimulus would be characterized by the vibration PSDs in the sensor's three principal coordinate axes, and by the associated cross power spectra.

CONCLUSION

It is to be understood that the above description is intended to be illustrative, and not restrictive. Many other embodiments will be apparent to those of skill in the art upon reviewing the above description. For instance, while inertial sensor compensation is described, the outputs of virtually any type of sensor, such as pressure, gas flow, temperature, etc. may also be compensated in the same manner, provided that suitable measurements are available to characterize the real time vibration environment.

In one embodiment of the invention the vibration power spectra estimation function is performed using software algorithms hosted in a general purpose microprocessor. An alternative embodiment uses a dedicated digital signal processor type hardware device as a coprocessor tasked with generating the PSD estimates. Still further embodiments will be apparent.

In further embodiments, sets of calibration coefficients are provided for selected temperature ranges for sensors which exhibit temperature-dependent vibration sensitivity coefficients. This embodiment includes a temperature sensor located proximate to the sensor being compensated. An output of the temperature sensor is used by the compensation module to obtain the correct set of compensation coefficients.

The scope of the invention should, therefore, be determined with reference to the appended claims, along with the full scope of equivalents to which such claims are entitled.

What is claimed is:

1. A method of reducing the effect of vibration-induced errors in a sensor (124), the method comprising:
    receiving from a calibration procedure a set of calibration sensitivity coefficients relating vibration power levels at various frequencies to errors of the particular sensor (124);
    obtaining high data rate vibration samples from a further sensor (126);
    estimating vibration power spectral density (130); and
    combining the estimates with the calibration coefficients to generate real time vibration-induced error correction (134) for the sensor (124).

2. The method of claim 1 wherein estimating vibration power spectral density further comprises computing vibration power values in multiple frequency bins.

3. The method of claim 1 wherein the previously determined calibration coefficients are determined in a factory vibration stimulus calibration procedure.

4. The method of claim 1 wherein the previously determined calibration coefficients are determined with respect to the actual sensors being corrected.

5. The method of claim 1 wherein the previously determined calibration coefficients are determined with respect to a family of sensors.

6. The method of claim 5 wherein the family of sensors comprises sensors manufactured in a same batch.

7. A computer readable medium having instructions stored thereon for causing a computer to perform the method of claim 1.

8. The method of claim 1 wherein the vibration power spectral density is estimated in one axis.

9. The method of claim 1 wherein the vibration power spectral density is estimated in three axes.

10. A computer implemented method of compensating for vibration induced error in sensors, the method comprising:
    receiving from a calibration procedure a set of sensitivity coefficients relating vibration power levels at various frequencies to a bias-like error of a particular sensor;
    buffering vibration samples from a further sensor in at least one axis of vibration;
    computing a power spectral density for such buffered vibration samples;
    computing vibration power values in multiple frequency bins;
    combining the vibration power values with the sensitivity coefficients to obtain estimated vibration induced errors.

11. The method of claim 10 wherein the frequency bins are equal in frequency range.

12. The method of claim 10 wherein the frequency bins are smaller in frequency range about one or more predetermined frequencies.

13. The method of claim 10 applied to multiple axes of vibration.

14. The method of claim 10 wherein the vibration power values in the multiple frequency bins are representative of the mean-squared vibration level in each bin.

15. The method of claim 10 wherein the vibration samples are obtained via band pass filters corresponding to the multiple frequency bins.

16. The method of claim 10 wherein the predetermined vibration sensitivity coefficients are determined in a factory vibration stimulus calibration procedure.

17. The method of claim 10 wherein the predetermined vibration sensitivity coefficients are determined via comparison of measurements unaffected by vibration to those obtained from the sensor which is affected by vibration in real time.

18. The method of claim 17 wherein the sensors comprise a gyroscope and an accelerometer, and wherein the measurements unaffected by vibration comprise GPS position measurements.

19. A computer readable medium having instructions stored thereon for causing a computer system to perform the method of claim 10.

20. A method of calculating correction coefficients for a particular inertial sensor comprising:
    for each j of a plurality of M test conditions having N<M different dominant vibration frequencies,
        subjecting the sensor to a reference acceleration corresponding to the jth test condition;
        measuring acceleration of the sensor from the sensor output;
        computing vibration power in selected frequency bins corresponding to the measured acceleration;
        providing a difference in measured acceleration from a reference acceleration;
        combining the measured acceleration and the difference to obtain vibration sensitivity coefficients for the jth test condition.

21. A system that provides vibration calibration coefficients for a sensor affected by vibration, the system comprising:
    means for receiving measured acceleration from an output of the sensor for a plurality of test conditions having different dominant vibration frequencies;
    means for computing vibration power resulting from each of the test conditions in selected frequency bins;
    means for providing a difference in measured acceleration from a reference acceleration corresponding to each of the test conditions; and
    means for combining the measured acceleration and the difference from each of the test conditions to obtain vibration sensitivity coefficients for all of the frequency bins.

22. The system of claim 21 and further comprising means for ensuring that the sensor is subjected to the measured acceleration.

23. A system for compensating for vibration induced sensor (120) error, the system comprising:
    an accelerometer (126);
    an estimator (130) coupled to the accelerometer (126) for producing a power spectral density;
    a compensation module (134) for combining the power spectral density and a plurality of calibration sensitivity coefficients (140) relating vibration power levels at various frequencies to a bias-like error of a particular sensor to provide a compensation value for the sensor output.

24. The system of claim 22 wherein the accelerometer comprises an accelerometer for each axis of vibration.

25. The system of claim 22 wherein the sensor comprises a vibratory mechanism.

26. The system of claim 25 wherein the sensor comprises a gyros.

27. The system of claim 26 wherein the sensor further comprises an accelerometer for which compensation values are also provided by the compensation module.

28. The system of claim 22 wherein the sensor comprises an inertial sensor.

29. The system of claim 28 and further comprising a rigid assembly for mounting the inertial sensor and the accelerometer.

30. A system for compensating for vibration induced error in a sensor, the system comprising:
    means holding a set of sensitivity coefficients relating vibration power levels at various frequencies to a bias-like error associated with the particular sensor;
    means for buffering vibration samples in at least one axis of vibration;
    means for computing a power spectral density for such buffered vibration samples;
    means for computing vibration power values in multiple frequency bins;
    means for combining the vibration power values with the sensitivity coefficients to obtain estimated vibration induced errors for the sensor.

* * * * *